(12) United States Patent
Hunzinger

(10) Patent No.: US 6,512,927 B2
(45) Date of Patent: Jan. 28, 2003

(54) METHOD AND APPARATUS FOR SIMULTANEOUS RESCUE OF MULTIPLE CONNECTIONS IN TELECOMMUNICATION SYSTEMS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/008,232

(22) Filed: Nov. 6, 2001

(65) Prior Publication Data

US 2002/0058528 A1 May 16, 2002

Related U.S. Application Data

(60) Provisional application No. 60/248,947, filed on Nov. 14, 2000.

(51) Int. Cl.⁷ .................................................. H04Q 7/20
(52) U.S. Cl. ........................ 455/452; 455/450; 370/329
(58) Field of Search .............................. 455/438, 437, 455/450, 452, 436, 461; 370/329, 330, 331, 332

(56) References Cited

U.S. PATENT DOCUMENTS

| | | | |
|---|---|---|---|
| 5,081,671 A | 1/1992 | Raith et al. | |
| 5,301,356 A | 4/1994 | Bodin et al. | |
| 5,353,332 A | 10/1994 | Raith et al. | |
| 5,530,912 A | 6/1996 | Agrawal et al. | |
| 5,749,055 A | 5/1998 | Dahlin | |
| 5,781,856 A | 7/1998 | Jacobs et al. | |
| 5,884,174 A | * 3/1999 | Nagarajan et al. | 455/438 |
| 5,913,167 A | * 6/1999 | Bonta et al. | 455/438 |
| 6,246,872 B1 | 6/2001 | Lee et al. | |
| 6,337,983 B1 | * 1/2002 | Bonta et al. | 455/437 |

FOREIGN PATENT DOCUMENTS

EP  1 024 606 A2  8/2000

* cited by examiner

*Primary Examiner*—Nguyen T. Vo
*Assistant Examiner*—James K Moore
(74) *Attorney, Agent, or Firm*—Morrison & Foerster LLP

(57) ABSTRACT

A method for rescuing communication connections from dropping when multiple connections are failing simultaneously is disclosed. The simultaneous rescue of connections is applicable to both forward and reverse-based rescue procedures. In one approach, the network can assign rescue codes to the MSs, and simultaneous rescues can thereafter be initiated using rescue channels defined by the rescue codes. To minimize the chance of collisions, the network may attempt to ensure that the MSs in need of rescue use different rescue codes, to the extent possible. In another non-mutually exclusive approach, the network can sequentially rescue the connections in danger of being dropped using rescue slots. In the rescue slot approach, individual MSs choose, or are assigned, different rescue slots in which to attempt a rescue.

30 Claims, 9 Drawing Sheets

METHOD AND APPARATUS FOR SIMULTANEOUS RESCUE OF MULTIPLE CONNECTIONS IN TELECOMMUNICATION SYSTEMS

CROSS-REFERENCE TO RELATED APPLICATIONS

Embodiments of the present invention claim priority from U.S. provisional patent application Ser. No. 60/248,947 entitled "Improvement to Rescue Chahnel to Support Simultaneous Rescue of Multiple Dropped Calls," filed Nov. 14, 2000, and are related to U.S. utility application Serial No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to methods and apparatus for simultaneously preventing loss of signal and dropped connections between multiple mobile stations, such as cellular or PCS telephones, and a communication infrastructure (network).

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the forward link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because the term BS is often used to generally identify a transceiver, it should be understood that the terms BS and sector are used herein somewhat interchangeably. The forward and reverse links utilize a number of forward and reverse channels. For example, the BS 26 broadcasts on a plurality of forward channels. These forward channels may include, but are not limited to, one or more pilot channels, a sync channel, one or more paging channels, and multiple forward traffic channels. The pilot, sync, and paging channels are referred to as common channels because the BS 26 communicates those channels to all MSs. Generally, these common channels are not used to carry data, but are used to broadcast and deliver common information. In contrast, the multiple forward traffic channels are referred to as dedicated channels, because each forward traffic channel is intended for a specific MS 24 and may carry data.

Each sector within BS 26 broadcasts a pilot channel that identifies that sector and is simple for a MS 24 to decode. Both sectors and pilot channels are distinguished by pseudo-noise (PN) offsets. The word "pilot" can be used almost interchangeably with the term sector, because a pilot channel identifies a sector.

The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS.

When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message.

In general, each BS may utilize one pilot channel, one sync channel and one paging channel that are common for all MSs to receive. However, because there are practical limitations the number of MSs that can be simultaneously paged using one paging channel, some BSs may employ multiple paging channels.

The reverse channels may include an access channel and one or more reverse traffic channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window. In code division multiple access (CDMA), given a space of frequency and time, channels are defined by codes such as Walsh codes or quasi-orthogonal functions (QOF) such that the channels have minimal interference with one another even though they may be transmitted in the same frequency band and during the same time. In direct sequence CDMA, the data from each channel is coded using Walsh codes or QOFs and then combined into a composite signal. This composite signal is spread over a wide frequency range at a particular time. When this composite signal is decoded using the same code used to code the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary. However, noise and interference in the field may require error correction to determine what was actually transmitted. The CDMA wireless communication system is fully described by the following standards, all or which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95B, published Feb. 1, 1999; and TIA/VEIA/IS-2000, Volumes 1–5, Release A, published Mar. 1, 2000.

With further reference to CDMA for purposes of illustration only, the Walsh codes or QOFs are used to code a particular channel. Thus, as described above, the simple to decode pilot channel may be the all one coded $W_0$ Walsh code. Similarly, the sync channel may use the alternating polarity $W_{32}$ Walsh code and again, these codes are fixed and known.

Each MS groups the channels into various sets, which may include, but is not limited to, an active set, a neighbor set, a candidate set, and a remaining set.

The MS active set contains the pilots or PN offset identifiers that a MS is utilizing at any point in time. Thus, when a MS is idle, but monitoring a single BS for pages and overhead updates, the active set for that MS will contain that BS pilot or PN offset identifier as its only member.

There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined, the data from a strong channel may be weighted more heavily than data from a weak channel, which is likely to have more errors. Thus, the data with a higher likelihood of being correct is given higher weight in generating the final result.

When a MS is idle, a neighbor set which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value." The neighboring pilot channel information, known in the art as a Neighbor Set, may be communicated to the MS through network infrastructure entities including BS controllers (BSC) 40 that may control a cell cluster 42, or a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes certain pilots from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a BS or network Active Set according to the Pilot Strength Measurement Message, and may notify the MS 36 of the new Active Set via an HDM. It should be noted, however, that the new active set may not always exactly comply with the MS's request, because the network may have BS resource considerations to deal with.

The MS 36 may maintain communication with both the old BS 38 and the new BS so long as the pilots for each BS are stronger than a "pilot drop threshold value." When one of the pilots weakens to less than the pilot drop threshold value, the MS 36 notifies the BSs of the change. The BSs may then determine a new Active Set, and notify the MS 36 of that new Active Set. Upon notification by the BSs, the MS 36 then demotes the weakened pilot to the Neighbor Set. This is one example of a handoff scenario. It is typical for a MS 36 to be starting a handoff or in the process of handoff when connections fail. This is expected because poor coverage or weak signal environments generally exist near cell boundaries, in areas of pilot pollution, or areas significantly affected by cell breathing, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}(=9)$ times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}(=12)$ consecutive bad frames 50, the response to which is to disable its transmitter 52. If it is then unable to receive $N_{3m}(=2)$ consecutive good frames before a fade timer expires after $T_{5m}(=5)$ seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame errorrates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Within each frame 64 is a header area 66, some signaling information 68 and perhaps some data 70. It should be understood that the content of the frames 64 can differ. One frame may contain signaling and data, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate.

In a practical communications network, it is neither realistic nor desirable to target an error rate of zero percent (i.e., all frames received properly). Rather, a frame error rate of one percent, for example, is targeted. Power control loops actually control this frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power and allow the frame error rate to move up to one percent. The BS may therefore continuously instruct the MS, through power control bits in a configuration message, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel. Thus, both the BS and the MS may continuously provide each other feedback in order to change the other's power levels. However, the BS may not necessarily change its transmitter power levels based on the feedback from the MS.

Despite the aforementioned power control loop, error rates may not be controllable to about one percent as a MS moves about in a cellular network and experiences variations in signal strength and signal quality due to physical impediments, interference from adjacent channels, and positions near the edges of sectors, and as the error rates rise to intolerable levels, dropped connections become a problem.

Rescue Procedures

Rescue procedures based on the reverse link or restarting the connection have previously been proposed. In a typical reverse based rescue procedure, the MS transmits a rescue channel while the communications network utilizes one or more sectors in an attempt to demodulate the rescue channel. However, proposed rescue procedures based on restarting the connection utilize the random access channel and require a lot of power because the MS is probing, which also introduces a lot of interference. In addition, proposed reverse-based rescue procedures were activated only during a forward fade condition, and are deficient because the MS transmits before the BS, which is less efficient for reasons which will be explained hereinafter.

To overcome the deficiencies presented by reverse-based rescue procedures, forward based rescue procedures have been proposed. One such forward based rescue procedure is disclosed in U.S. utility application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data calls, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. As mentioned above, although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM (s) that it has sent (whether or not the PSMM was actually sent, successfully sent, or acknowledged). In other words, the MS promotes pilots to the Active set autonomously without a handoff direction (i.e. the new active set is the union of the old active set and the autonomously promoted active pilots: S"=S U S') (see reference character 76). The MS then begins to cycle through this new Active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on the forward based rescue procedure, see U.S. utility application Ser. No. 09/978,974 entitled "Forward Link Based Rescue Channel Method and Apparatus for Telecommunication Systems," filed Oct. 16, 2001.

However, the FRP described above only discloses a procedure for rescuing a single connection at a time. Thus, a mechanism is needed to simultaneously rescue multiple connections in danger of being dropped.

SUMMARY OF THE INVENTION

Embodiments of the present invention provide an efficient and safe procedure to rescue communication connections from dropping when multiple connections are failing simultaneously. The simultaneous rescue of connections is applicable to both forward and reverse-based rescue procedures. In one approach, the network can assign rescue codes to the MSs, and simultaneous rescues can thereafter be initiated using rescue channels defined by the rescue codes. To minimize the chance of collisions, the network may attempt to ensure that the MSs in need of rescue use different rescue codes, to the extent possible. This may be accomplished by having many rescue codes, strategically assigning rescue codes, pseudo-randomly assigning rescue codes to MSs (e.g. using an ESN-based hash), and the like.

In one embodiment of the present invention, each time a MS fails, the remaining MSs may be assigned an equal distribution of rescue codes not being used by a failing MS, until there was only one unused rescue code remaining, at which time all remaining MSs would be assigned to that one unused rescue code. In addition, as a failing MS is rescued, its assigned rescue code can be made available again, and the strategic assignment of rescue codes can be revised to account for this newly available resource. In an alternative embodiment, each time a MS fails, the MS next most likely to fail would be assigned a rescue code not being used by a failing MS, and the remaining MSs would be assigned an equal distribution of the remaining rescue codes not being used by a failing MS. When there is only one unused rescue code remaining, all of the remaining MSs would be assigned an equal distribution of all rescue codes.

In another non-mutually exclusive approach, the network can sequentially rescue the connections in danger of being dropped using rescue slots. In this rescue slot approach, the rescue of simultaneously occurring failing connections are sequenced so that simultaneous rescues are actually avoided. Individual MSs choose, or are assigned, different rescue slots in which to attempt a rescue. A rescue slot may be defined to equal to a typical rescue duration, so that each rescue slot should provide enough time to effect a rescue. Alternatively, the rescue slot may be equal to the MS transmit duration during a rescue attempt, or less than the MS transmit duration.

The network system time can be divided into rescue cycles and rescue slots, wherein each MS will be assigned to a particular rescue slot within a rescue cycle. The length of the rescue cycle and the number of rescue slots in the rescue cycle may be defined by a particular communication standard, or may be configurable using overhead messages. Every MS uses the same system time reference to calculate when its assigned rescue slot occurs, and rescue can begin. Note that multiple MSs may be assigned to the same rescue slot.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. It should be further understood that although the description provided herein primarily references the CDMA communication protocol for purposes of explanation only, embodiments of the present invention are applicable to other communication protocols and digital radio technologies generally, and include, but are not limited to, CDMA, TDMA, FDMA, GSM, GPRS, and the like. For example, although embodiments of the present invention described below utilize multiple codes to define multiple rescue channels for use in simultaneous rescues for purposes of illustration, the concepts of code-based simultaneous rescue should be understood to encompass TDMA-based simultaneous rescue, wherein multiple time slots define multiple rescue channels for use in simultaneous rescue, FDMA-based simultaneous rescue, wherein multiple frequency bands define multiple rescue channels for use in simultaneous rescue, and other multiple access communication protocols.

Code-Based Simultaneous Rescue

Simultaneous rescue of connections in danger of being dropped are applicable to both forward and reverse-based rescue procedures. In a code-based approach according to one embodiment of the present invention, the BS may send multiple rescue codes to the MSs in advance of any failures, and simultaneous rescues of failing connections can thereafter occur using different rescue channels defined by the rescue codes. These rescue codes may be strategically distributed to the MSs and dynamically changed to minimize the chance that multiple MSs may attempt a rescue using the same rescue channel. In the forward link, Walsh codes or QOFs define the rescue codes. In the reverse link, Walsh codes, long or short codes (one type of QOF) can also be used to define the rescue codes. Long codes are generally used for encryption on the forward link, and are used for MS channelization on the reverse link (i.e., each MS has its own long code).

Figure 1:
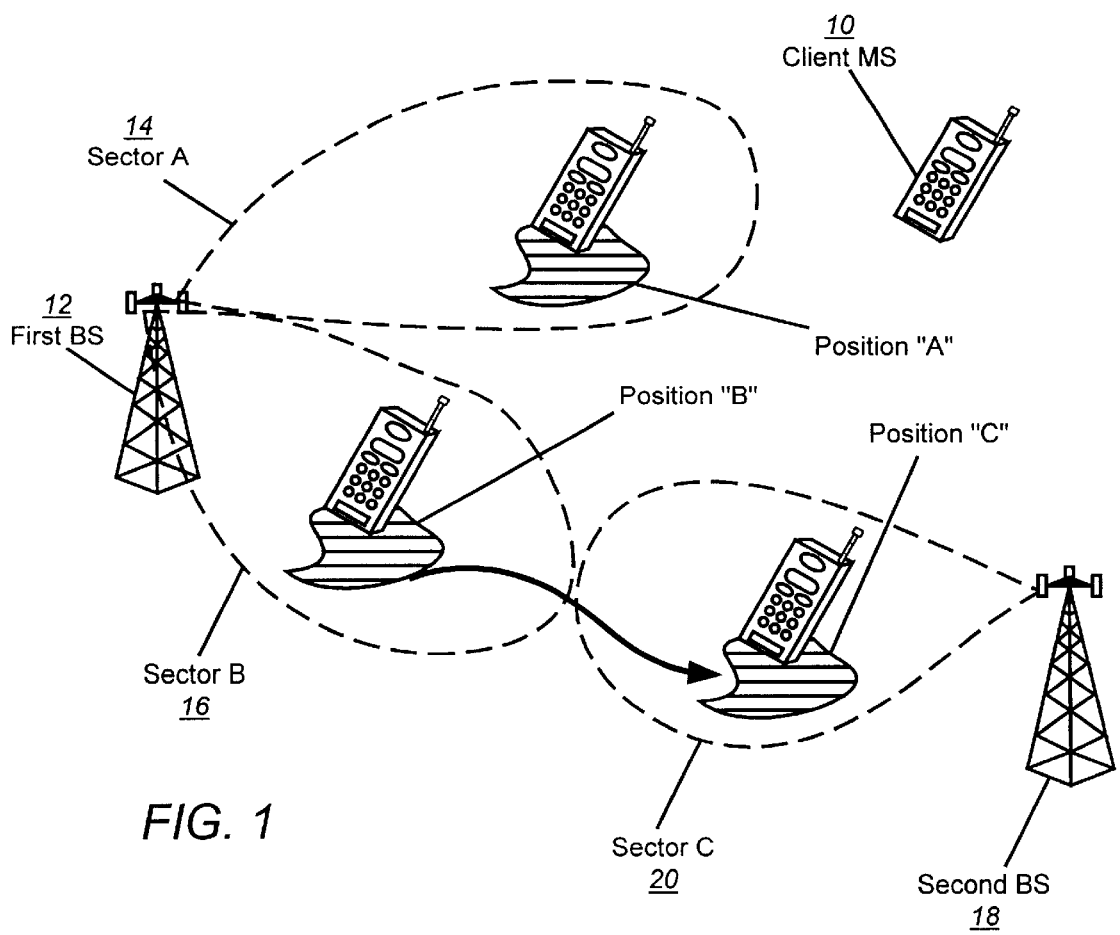
FIG. 1 illustrates a roving mobile station moving amongst different locations between sectors in a wireless communication system.
Figure 2:
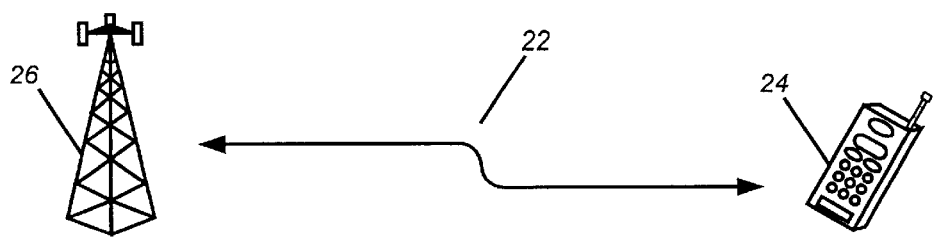
FIG. 2 illustrates an exemplary communication link between a mobile station and a base station in a wireless communication system.
Figure 3:
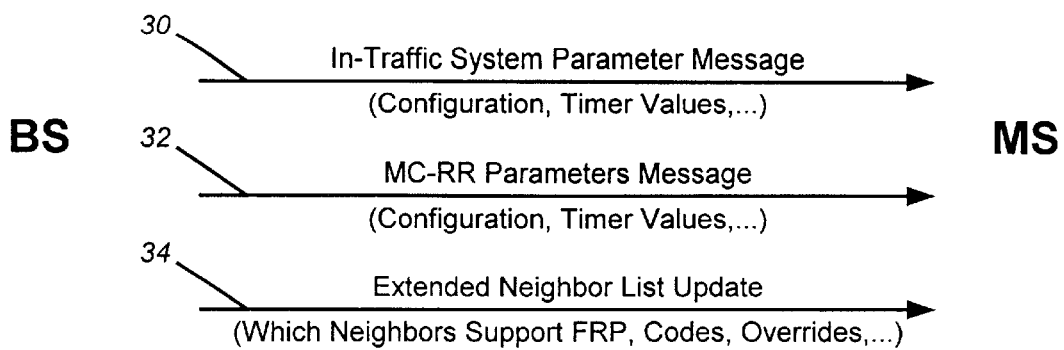
FIG. 3 illustrates overhead messages communicated from a base station to a mobile station in a wireless communication system.
Figure 5:
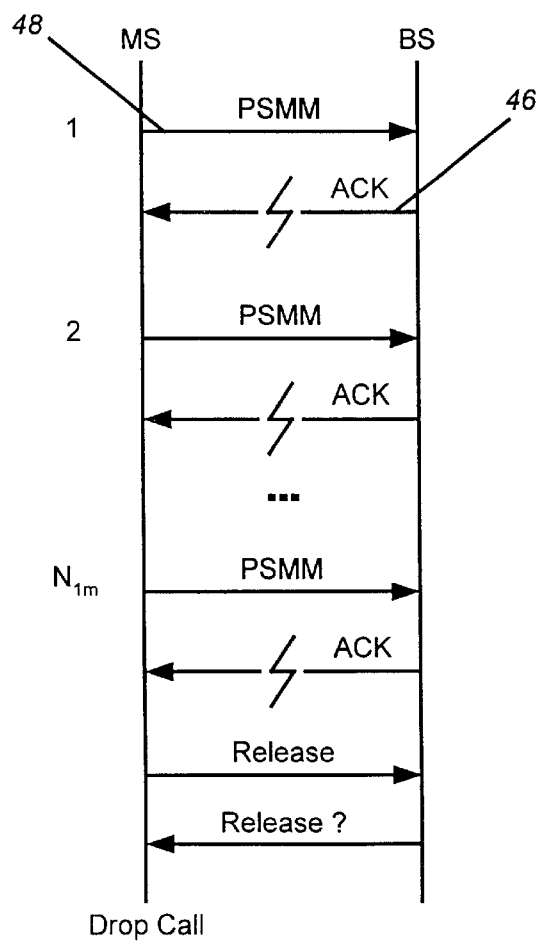
FIG. 5 is a message sequence between a mobile station and a base station resulting in a dropped connection due to Layer 2 Acknowledgement failure.
Figure 4:
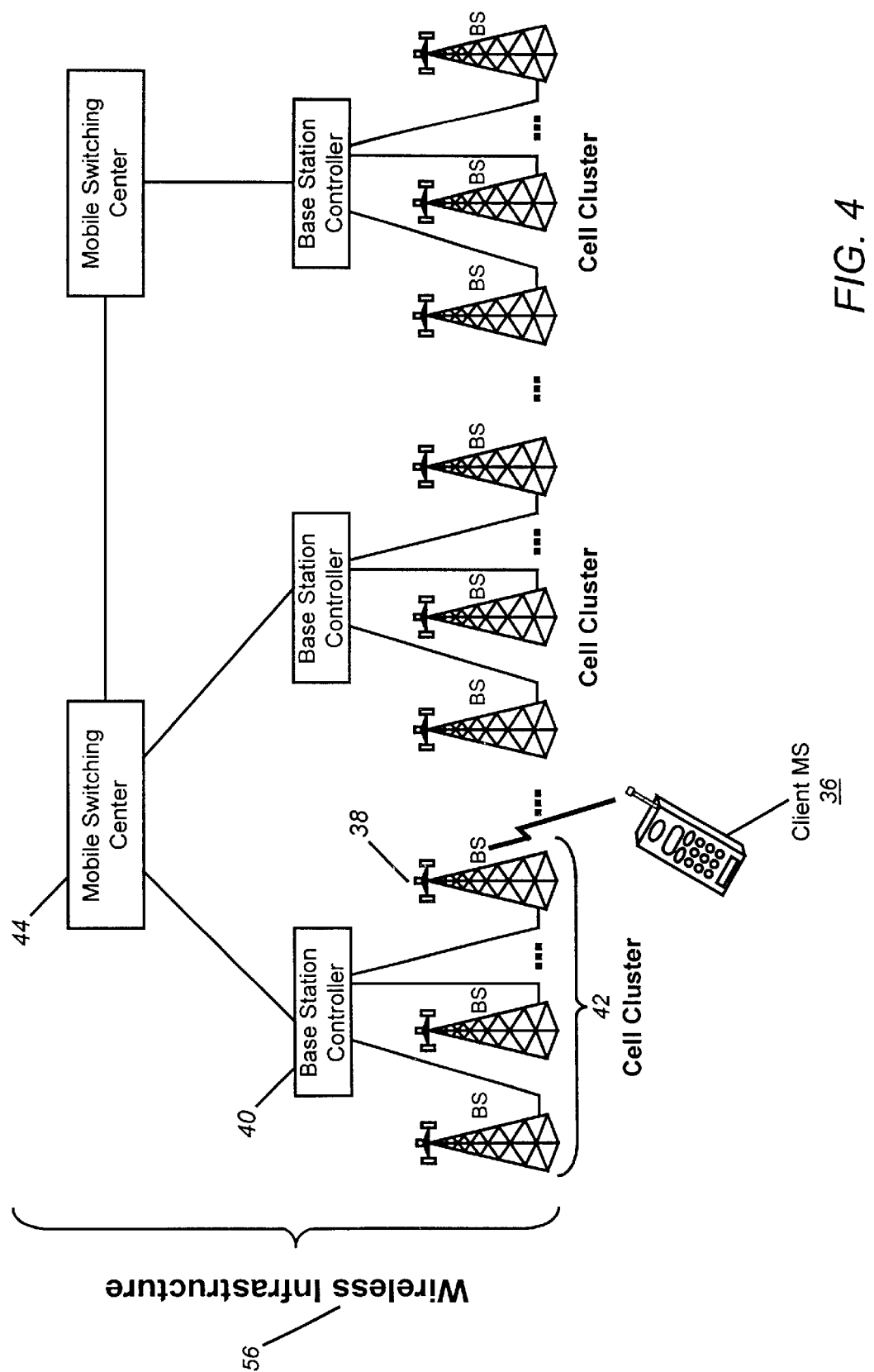
FIG. 4 illustrates a wireless communication infrastructure in communication with a roving mobile station.
Figure 6:
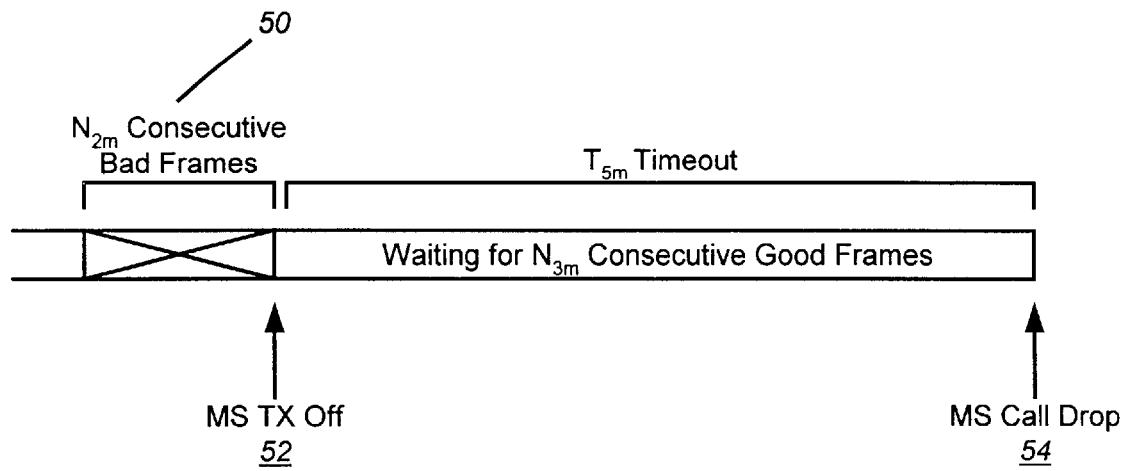
FIG. 6 is a timeline that is representative of a dropped connection resulting from fading of the forward link in a wireless telecommunications network.
Figure 7:
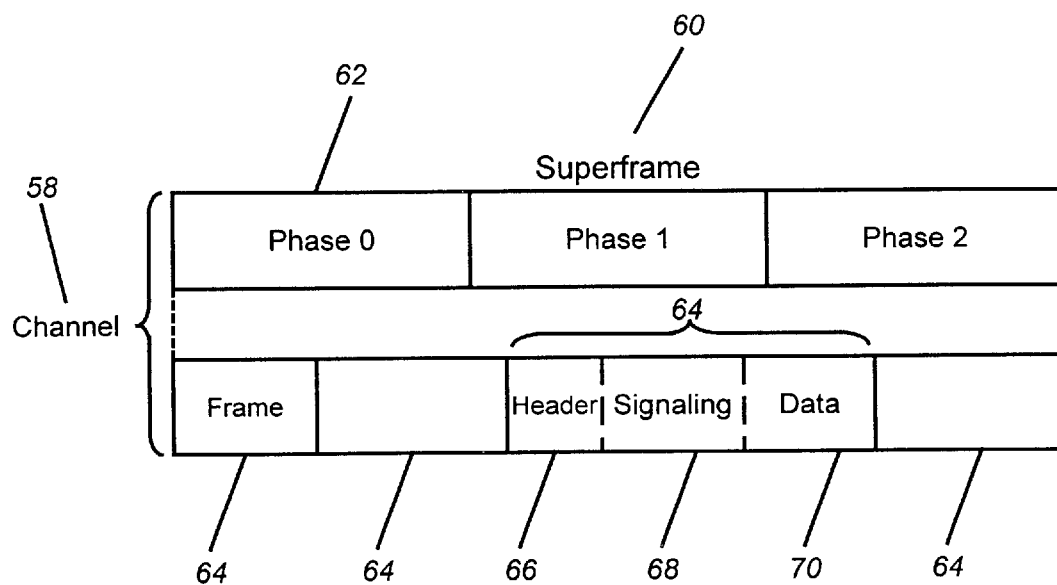
FIG. 7 is a timeline of a superframe, divided into three phases and four frames, for use in a wireless telecommunications network.
Figure 8:
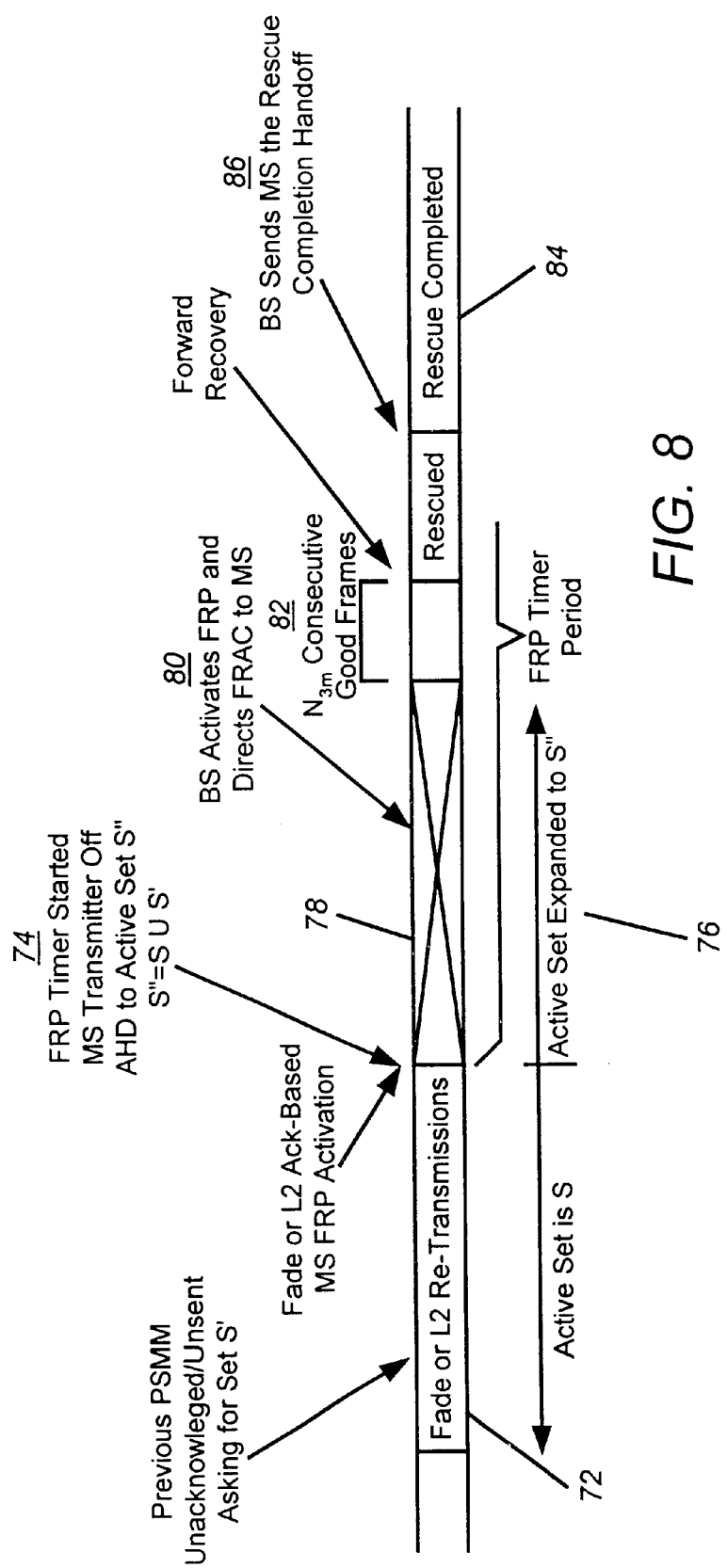
FIG. 8 is a timeline of one embodiment of the Forward Rescue Procedure when it is activated.
Figure 9:
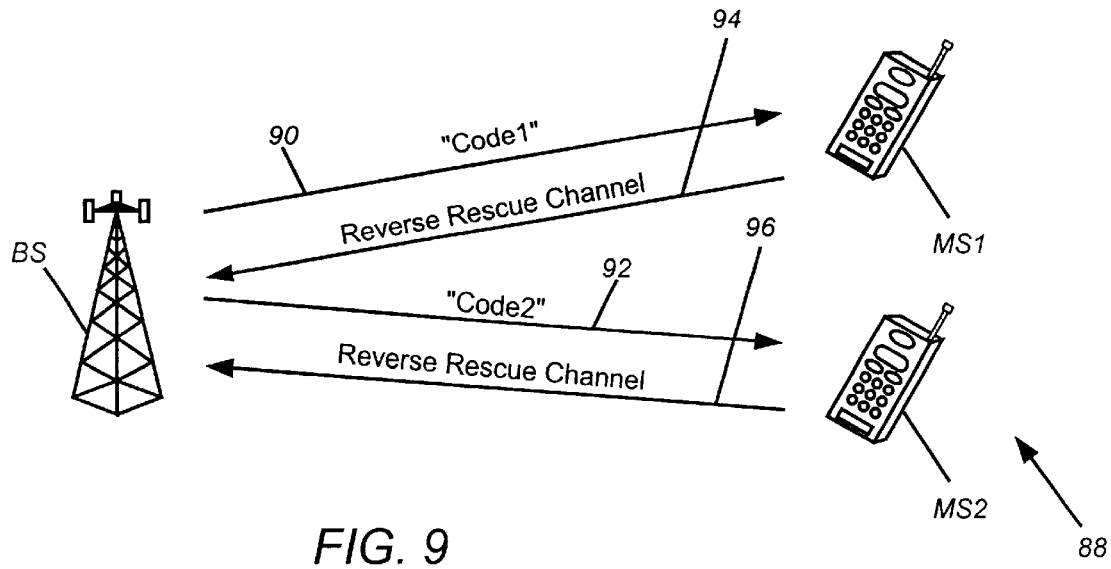
FIG. 9 illustrates an example of a simultaneous code-based reverse link rescue according to an embodiment of the present invention.

FIG. 9 illustrates an example of a simultaneous code-based reverse link rescue 88 according to an embodiment of the present invention. In the example system environment of FIG. 9, prior to detecting any connections in danger of failing, MS1 is instructed to use CODE1 as a rescue channel via an overhead message 90, and MS2 is instructed to use CODE2 as a rescue channel via overhead message 92. Any number of strategies may be employed to assign rescue codes and rescue channels to MSs. To minimize the chance of collisions, code-based rescue procedures according to embodiments of the present invention may attempt to ensure that the MSs in need of rescue use different rescue codes, to the extent possible. This may be accomplished by having many rescue codes, strategically assigning rescue codes, pseudo-randomly assigning rescue codes to MSs (e.g. using an ESN-based hash), and the like, discussed in greater detail below. However, the code space (number of codes available) and practical considerations (e.g., interference that may occur if channels are too closely spaced) serve to limit the number of different rescue channels that are available at any time. Alternatively, these rescue codes could have been be pre-defined in the standard.

When MS1 detects a failing connection, it transmits a reverse rescue channel 94 to the BS using CODE1, and when MS2 detects a failing connection, it transmits a reverse rescue channel 96 to the BS using CODE2. In the example of FIG. 9, these transmissions can occur at the same time, because they use different rescue channels, as defined by rescue codes CODE1 and CODE2. At some point in time, the BS will find and demodulate a predetermined number of good frames of the rescue channels defined by CODE1 and CODE2 and begin to transmit back to MS1 and MS2. Once MS1, MS2 and the BS receive a predetermined number of good frames, the rescue is completed, the connection can be continued, and the BS may re-assign the MS to more permanent channels.

Figure 10:
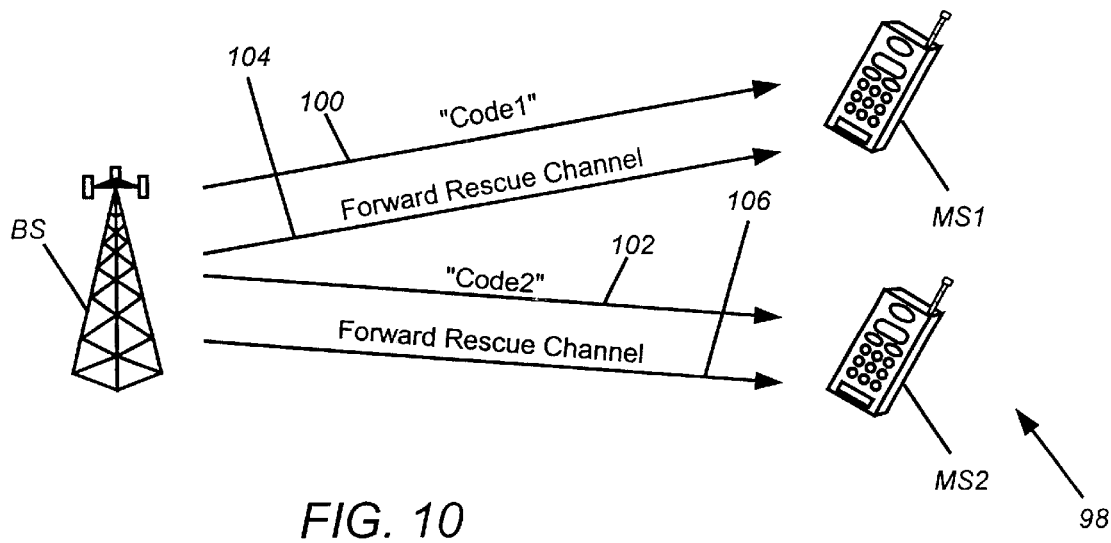
FIG. 10 illustrates an example of a simultaneous code-based forward link rescue according to an embodiment of the present invention.

FIG. 10 illustrates an example of a simultaneous code-based forward link rescue 98 according to an embodiment of the present invention. In the example system environment of FIG. 10, prior to detecting any connections in danger of failing, MS1 is instructed to use CODE1 as a rescue channel via overhead message 100, and MS2 is instructed to use CODE2 as a rescue channel via overhead message 102. Again, any number of strategies may be employed to assign rescue codes and rescue channels to MSs. When MS1 detects a failing connection, the BS transmits a forward rescue channel 104 to MS1 using CODE1, and when MS2 detects a failing connection, the BS transmits a forward rescue channel 106 to MS2 using CODE2. In the example of FIG. 10, these transmissions can occur at the same time, because they use different rescue channels, as defined by rescue codes CODE1 and CODE2. However, as in the reverse-link rescue of FIG. 9, to minimize the chance of collisions, embodiments of the present invention may attempt to ensure that the MSs in need of rescue use different rescue codes, to the extent possible. At some point in time, MS1 and MS2 will find and demodulate a predetermined number good frames of the rescue channels defined by CODE1 and CODE2, turn on their transmitters, and begin to transmit back to the BS. Once MS1, MS2 and the BS receive a predetermined number of good frames, the rescue is completed, the connection can be continued, and the BS may re-assign the MS to more permanent channels.

As mentioned above, the MS in danger of failing must know which rescue code to use for rescue in the case of a reverse-based rescue procedure, or which rescue channel to look for in the case of a forward-based rescue procedure. In one embodiment of the present invention, rescue codes may be strategically assigned to MSs in advance of the failure, to minimize the probability that multiple failing MSs will attempt to rescue using the same rescue channel. In one example embodiment in which only two rescue codes CODE1 and CODE2 are available for purposes of simplicity of illustration only, the two rescue codes may be initially distributed randomly but evenly to all MSs. If one MS with an assigned rescue code of CODE1 is detected as failing, all other MSs can be assigned CODE2. By doing so, if a second MS fails before the first failing MS is rescued, the second failing MS will be certain to use a different code from the first failing MS. However, this embodiment leaves all of the remaining MSs assigned to CODE2, so that if more than two MSs simultaneously fail, those MSs will all be trying to rescue using CODE2. This dynamic distribution of codes can be extended to situations where more than two rescue codes are available. Generally, each time a MS fails, the remaining MSs would be assigned an equal distribution of rescue codes not being used by a failing MS, until there was only one unused rescue code remaining, at which time all remaining MSs would be assigned to that one unused rescue code. In addition, as a failing MS is rescued, its assigned rescue code can be made available again, and the strategic assignment of rescue codes can be revised to account for this newly available resource.

In an alternative embodiment, if one MS with an assigned rescue code of CODE1 is detected as failing, CODE2 can be assigned to the MS next most likely to fail (described in greater detail below), and all other MSs would be assigned a 50/50 distribution of the two rescue codes. By doing so, if a second MS fails before the first failing MS is rescued, the second failing MS will likely use a different code from the first failing MS. In addition, this embodiment leaves all of the remaining MSs assigned equally to CODE1 and CODE2, so that if more than two MSs simultaneously fail, the distribution of MSs trying to rescue using CODE1 and CODE2 will likely be more evenly distributed. This dynamic distribution of rescue codes can be extended to situations where more than two rescue codes are available, and to identifying and assigning rescue codes to a succession of MSs determined to be likely to fail. Generally, each time a MS fails, the MS next most likely to fail would be assigned a rescue code not being used by a failing MS, and the remaining MSs would be assigned an equal distribution of the remaining rescue codes not being used by a failing MS. When there is only one unused rescue code remaining, all of the remaining MSs would be assigned an equal distribution of all rescue codes. In addition, as a failing MS is rescued, its assigned rescue code can be made available again, and the strategic assignment of rescue codes can be revised to account for this newly available resource. The embodiment described above also attempts to minimize the probability that multiple failing MSs will attempt to rescue using the same rescue channel, but additionally takes into account empirical evidence of MSs that may be likely to fail.

In other embodiments of the present invention, the network may assign a list of several rescue codes to each MS, and the MS will then perform a hashing function or other selection methodology to choose one of the rescue codes. The network will perform the same hashing function or selection methodology to identify which rescue code was actually chosen by the MS.

To determine the MS next most likely to fail, the BS could identify the MS that is receiving the weakest signals, based on PSMMs received from the MSs. Alternatively, the BS could identify a MS reporting the same type or pattern of pilot energies as the failing MS in a PSMM received from that MS. Such MSs may be in the same location as the failing MS, or may be experiencing the same type of communication difficulties as the MS, and therefore may fail in the near future. In another embodiment, if the MSs have locational capability, MSs in the same area as the failing MS could be identified as the next most likely to fail.

In addition, while monitoring MSs for forward link fade failures or L2 Acknowledgement failures (described in U.S. utility application Ser. No. 09/978,974 entitled "Forward Link Based Rescue Channel Method and Apparatus for Telecommunication Systems," filed Oct. 16, 2001), the BS could detect that a number of bad frames were received from a particular MS, although not enough to trigger the start of a rescue procedure. Such a MS could be identified as the MS next most likely to fail. Alternatively, the BS could detect that no proper acknowledgement was received from a MS after a number of retransmissions of a message by the BS, although not enough to trigger the start of a rescue procedure.

In further embodiments, a combination of factors could be used, such as identifying the MS that transmitted a number of bad frames (but not enough to trigger the start of a rescue procedure), and was in a particular location. It should be evident from the description of this hybrid embodiment that any number of variations of the above-described examples involving identifying the MS next most likely to fail, fall within the scope of the present invention.

Figure 11:
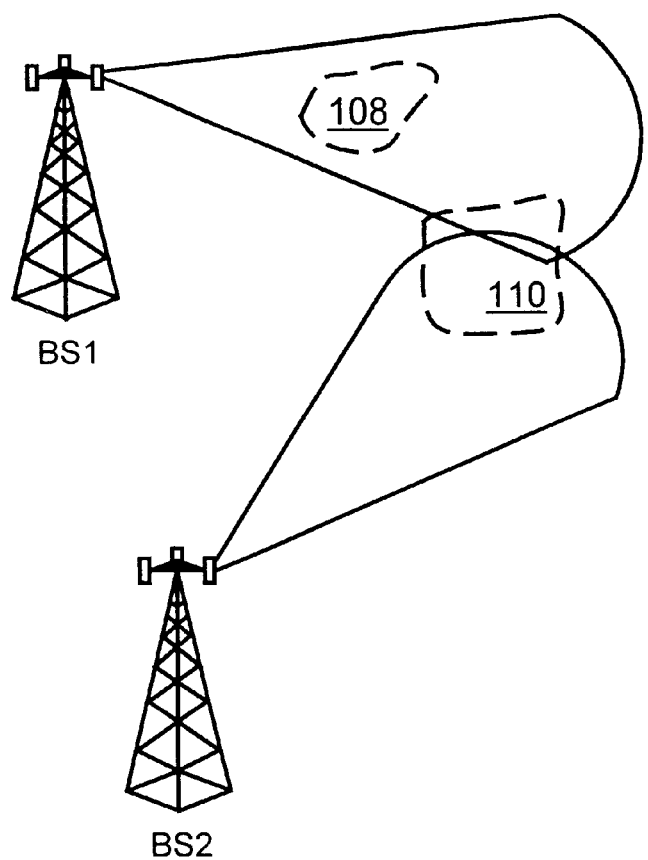
FIG. 11 illustrates an example of how location can be incorporated into the strategic assignment of rescue codes according to an embodiment of the present invention.

In other embodiments of the present invention, the strategic assignment of rescue codes may also take into account MS location, if the MSs have locational capability. The rescue codes could be initially assigned evenly based on MS locations within the network. A further embodiment incorporating location into the strategic assignment of rescue codes is illustrated in FIG. 11, wherein only two rescue codes CODE1 and CODE2 are available for purposes of simplicity of illustration only. In FIG. 11, some MSs are located close to the BS in region 108, and other MSs are located on the fringes of a sector in region 110. Initially, a random or equal distribution of the two rescue codes could be assigned to the MSs located in region 108 and 110. Because the MSs in region 110 have an increased likelihood of failing, by distributing rescue codes evenly throughout region 110, there is an increased chance that if two MSs within region 110 fail, they will be assigned different rescue codes. In addition, if a MS having an assigned rescue code of CODE1 in region 110 is detected as failing, the remaining MSs in region 110 could be assigned CODE2, because they are also candidates for failure, while the MSs in region 108 would be assigned CODE1, because they are less likely to fail.

In further embodiments, the assignment of a MS to a rescue code may be based on the priority of the MS. For example, government employees or users who pay a higher service fee may be given higher priority for rescue codes, or may be given rescue codes not assigned to any other MS. Assignment may also be based on the type of connection (voice, data, packet data, etc.), the order in which MSs failed in the past, or the likelihood that a MS will have a successful rescue. In determining the likelihood that a MS will have a successful rescue, the network may consider the frequency and timing of past rescues and other indicators such as the receipt of bad frames that are suggestive of a poor connection.

From the preceding discussion, it should be evident that any number of variations of the above-described examples involving strategic assignment of rescue codes and locational assignment, all generally directed to minimizing the chance of having two failing MSs attempting a rescue on the same rescue channel, fall within the scope of the present invention.

Rescue Slot-Based Simultaneous Rescue

Figure 12:
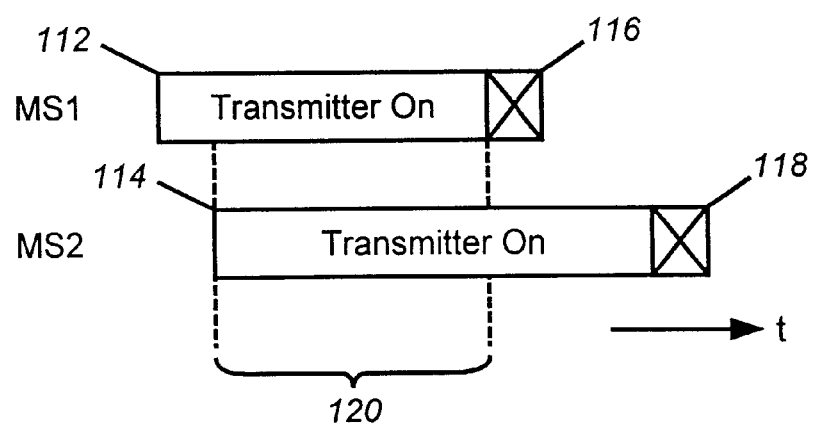
FIG. 12 illustrates an example of transmission overlap in a sequential reverse-based rescue that does not utilize rescue slots.

In another embodiment of the present invention, non-mutually exclusive with respect to the code-based scheme described above, the network can sequentially rescue the connections in danger of being dropped using rescue slots. In this rescue slot approach, the rescue of simultaneously occurring failing connections is sequenced so that simultaneous rescues are actually avoided. Nevertheless, this approach will be referred to herein as a "simultaneous" rescue approach, because the failures occur at or near the same time. For purposes of illustrating the disadvantages of attempting simultaneous rescues without rescue slots, FIG. 12 provides an overview of a sequential reverse-based rescue not employing rescue slots. In FIG. 12, MS1 is detected as failing at time 112, and MS2 is detected as failing at time 114. After a period of time 120 when both MS1 and MS2 are transmitting a rescue channel, MS1 may be rescued at time 116, and MS2 may be rescued at time 118. FIG. 12 illustrates an overlap 120 in which multiple MSs will try to transmit the same rescue channel at the same time, creating interference that may possibly prevent rescue. It should be understood that such a situation is not improbable, because simultaneous dropped connections can occur during peak usage time, or in the same location (in close proximity) because of multiple MSs experiencing similar conditions, and the same BS may also be needed to rescue to connection. This transmission overlap need not occur in forward based rescue procedures, because the network can sequence the transmission of the rescue channel such that only one MS is rescued at a time.

Figure 13:
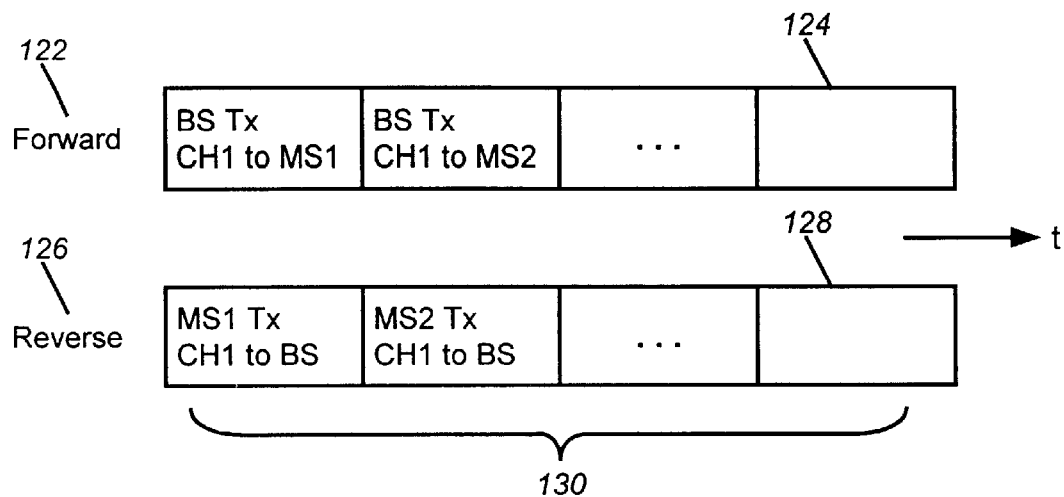
FIG. 13 illustrates the basic concepts of a slot-based simultaneous rescue scheme according to an embodiment of the present invention.

Embodiments of the present invention improve upon the sequential rescue scheme described above by using rescue slots. In the rescue slot approach, individual MSs choose, or are assigned, different rescue slots in which to attempt a rescue. FIG. 13 illustrates the basic concepts of a rescue slot-based simultaneous rescue scheme according to an embodiment of the present invention. For forward-based rescues 122, at each rescue slot 124 the BS will transmit a rescue channel (e.g. CH1) to a different MS (e.g. MS1, MS2, etc.). For reverse-based rescues 126, at each rescue slot 128 within a rescue cycle 130 a different MS (e.g. MS1, MS2, etc.) will transmit a rescue channel (e.g. CH1) to the same BS. In alternative embodiments, a plurality of rescue channels assigned to the MSs may be transmitted at each rescue slot.

The rescue slot approach requires that the MSs and the network operate in accordance with some predetermined time reference. BSs and MSs operate on a common time frame called system time that has certain points of reference that define modulation code timing, channel timing, slot timing, and the like. In one example of system time illustrated in FIG. 14, a paging channel 132 may be split into 80 ms superframes 134, each superframe containing four 20 ms frames 136. The superframe is also split into three phases 138. Each superframe 134 represents a portion of a paging slot 140 within a paging cycle 142. The actual assignment of a MS to a paging slot within a paging cycle may be defined by a hashing formula based on the MS's ESN and other parameters, and is therefore pseudo-random. Note that multiple MSs may be assigned to the same paging slot. As defined by a slot cycle index, a paging slot repeats at predictable intervals. During each paging slot, an idle MS assigned to that paging slot "wakes up" and looks for messages directed to it, such as a page.

In embodiments of the present invention, system time can be similarly divided into rescue cycles and rescue slots, wherein each MS will be assigned to a particular rescue slot within a rescue cycle. The length of the rescue cycle and the number of slots in the rescue cycle may be defined by a particular communication standard, or may be configurable using overhead messages for adapting to load conditions. Every MS uses the same system time reference to calculate when its assigned slot occurs, and rescue can begin.

The actual assignment of a MS to a rescue slot within a rescue cycle may be defined by a hashing formula based on the MS's ESN and other parameters, and is therefore pseudo-random. Note that multiple MSs may be assigned to the same rescue slot. In other embodiments, the assignment of a MS to a rescue slot may be based on location of the MS, similar to the assignment of a MS to a rescue code based on location as discussed with reference to FIG. 11. In further embodiments, the assignment of a MS to a rescue slot may be based on the priority of the MS. For example, government employees or users who pay a higher service fee may be given higher priority for rescue slots, or may be given rescue slots not assigned to any other MS. Assignment may also be based on the type of connection (voice, data, packet data, etc.), the order in which MSs failed in the past, or the likelihood that a MS will have a successful rescue. In determining the likelihood that a MS will have a successful rescue, the network may consider the frequency and timing of past rescues and other indicators such as the receipt of bad frames that are suggestive of a poor connection.

Figure 15:
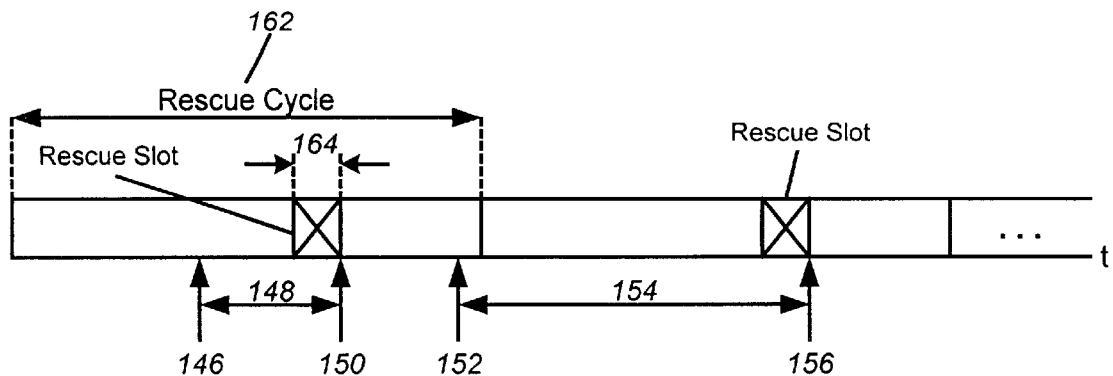
FIG. 15 illustrates that in the time slot simultaneous rescue approach, a MS can be rescued only during its assigned rescue slot, independent of when the failure was detected, according to an embodiment of the invention.

Thus, in the rescue slot simultaneous rescue approach, rescue does not necessarily begin at the time when an L2 Acknowledgement of a Forward Link Fade failure occurs, or when the FRP is activated. Once a MS is assigned a rescue slot, that MS can be rescued only during its assigned rescue slot, independent of when the failure was detected. For example, as illustrated in FIG. 15, if a failure is detected at time 146, the MS must wait a time period 148 until the rescue can be completed at time 150. However, if a subsequent failure is detected at time 152, the MS must wait a time period 154, where time period 154>time period 148 in the present example, until the rescue can be completed at time 156. Note that the delay should not be more than one complete rescue cycle 162 minus the slot time 164.

In the rescue slot approach, any number of slots may be made available for assignment to MSs. The number of slots are not limited to slots within a superframe, or other predefined time boundaries in system time. In one embodiment, the rescue cycle can be tied to the paging channel frame for the paging channel cycle, which can be minutes in duration, and thus many slots would be available within such a rescue cycle. However, if too many slots are available, a MS may have to wait too long for its turn to be rescued. Conversely, if too few slots are available, the likelihood increases that multiple MSs in need of rescue will be assigned to the same slot. Thus, further embodiments take into account the rescue cycle, number of MSs, the number of MSs likely to fail at any one time, and the like, and empirically determine the number of rescue slots which minimizes both the rescue wait time and the likelihood that multiple MSs in need of rescue will be assigned to the same slot.

In one embodiment of the present invention, a slot may be defined to equal to a typical rescue duration, so that each rescue slot should provide enough time to effect a rescue. Alternatively, the rescue slot may be equal to the MS or BS transmit duration (depending on whether the rescue procedure is reverse or forward based) during a rescue attempt. The MS or BS transmit duration is shorter than the duration of the rescue, and thus each rescue slot will not provide enough time for a rescue to be completed. However, by setting the rescue slot to be equal to the MS or BS transmit duration, simultaneous transmissions will be avoided, thereby eliminating the interference problems associated with having multiple MSs transmitting at the same time.

Figure 16:
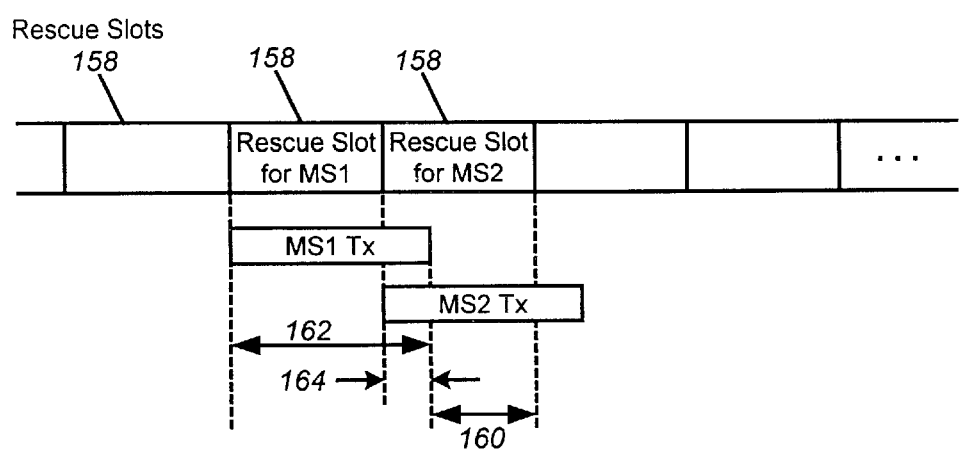
FIG. 16 illustrates that in the time slot simultaneous rescue approach, each rescue slot may be less than the MS transmit duration, creating the possibility of overlapping transmissions, according to an embodiment of the present invention.

In further embodiments of the present invention illustrated in FIG. 16, each rescue slot 158 may be less than the MS transmit duration 162 during a rescue attempt. This creates the possibility of overlapping transmissions 164, but allows for more slots to exist within a rescue cycle. Even with a transmission overlap, the network still has a period of time 160 in which only one MS is likely to be transmitting for rescue, and in which the BS need only respond to that particular MS. In this embodiment, although transmission overlap and interference is possible, because there are more rescue slots 158, the chance of having two failing MSs assigned to the same or adjacent rescue slots and encountering this transmission overlap is lower. Conversely, as the number of rescue slots and overlap decreases, the chance of having two failing MSs assigned to the same or adjacent rescue slots, where interference is more likely, goes up. Thus, a tradeoff exists between the number of slots, slot duration, and the chance of transmission overlap.

The following discussion is an example of how a rescue slot might be assigned to a particular MS by the network according to an embodiment of the present invention. The rescue channel slot CR_SLOT assigned to a particular MS may be defined as:

$$CR\_SLOT = PG\_SLOT \bmod CR\_SLOTS$$

wherein PG_SLOT is the paging slot assigned to that MS and CR_SLOTS is the total number of rescue slots. The above equation assumes PG_SLOT≧CR_SLOTS. The network may set CR_SLOTS to the known total number of rescue slots, or to a value that indicates an entry in a lookup table or formula that provides the number of rescue slots indirectly. For example, if there are eight available rescue slots (CR_SLOTS=8), and the MS's paging slot was 17 (PG_SLOT=17), then CR_SLOT for that MS would be one (slot 1 of rescue slots 0–7). Note that in the present example, PG_SLOT is used as a reference to system time, but other references to system time could also be used. The general equation for determining the rescue channel slot CR_SLOT to be assigned to a particular MS would be:

$$CR\_SLOT = [t/C1 + C2] \bmod CR\_SLOTS,$$

where t is the system time at the assigned slot, C1 is the slot time, and C2 is an offset factor.

Figure 14:
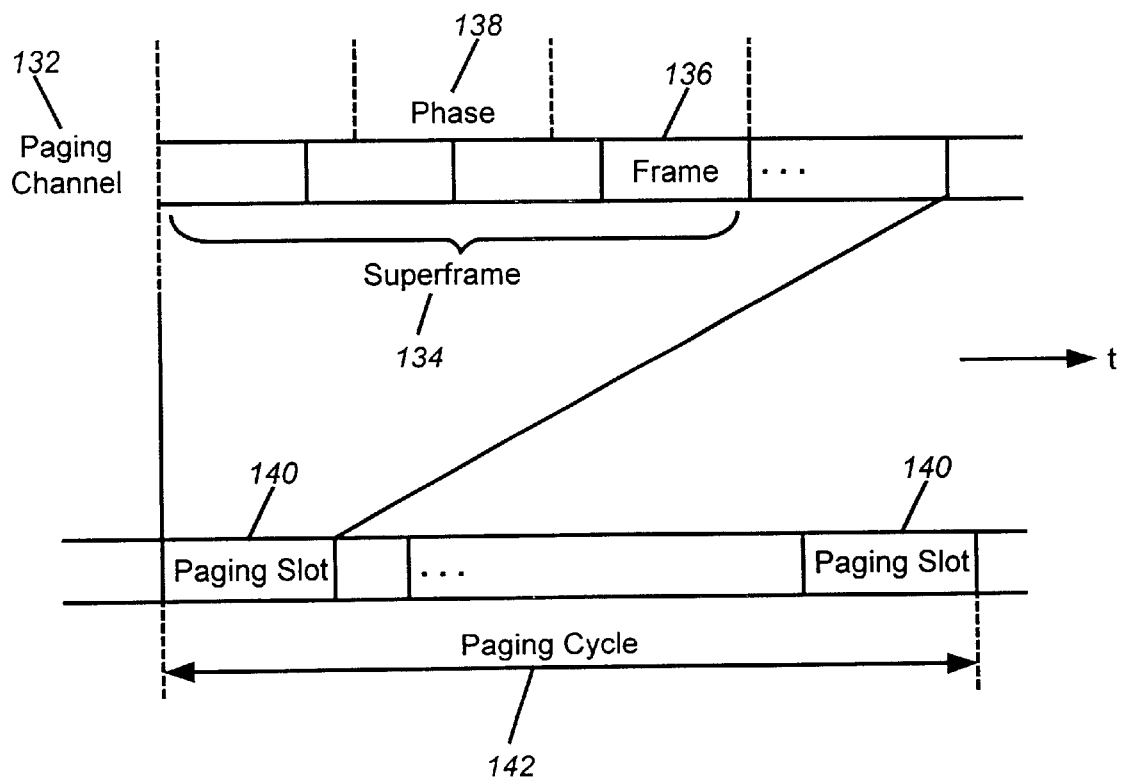
FIG. 14 illustrates a common time frame called system time that has certain points of reference that define modulation code timing, channel timing, paging slot timing, and the like according to an embodiment of the present invention.

In one example rescue channel scheme utilizing the system time example of FIG. 14 according to an embodiment of the present invention, a "rescue delay timer", which delays the start of rescue, is set to an initial value CR_DELAY_TIME (in frames) and started when a rescue procedure is initiated. Rescue is prohibited until the rescue delay timer reaches its terminal count. In this example, the total rescue waiting period for the MS may be set to the following initial value by the MS:

$$(CR\_DELAY\_TIME \times 80 + CR\_SLOT\_ALIGN \times 20) \text{ ms},$$

where CR_SLOT_ALIGN is the minimum number of frames that the MS must wait, independent of CR_DELAY_TIME, to arrive at the next occurrence of the MS's assigned slot at system time t. The addition of CR_SLOT_ALIGN ensures that rescue transmission from MSs that simultaneously drop calls are offset in time with high probability.

Hybrid Rescue Code and Rescue Slot-Based Simultaneous Rescue

As noted above, the rescue code and rescue slot embodiments for simultaneous rescue are not mutually exclusive. In other embodiments of the present invention, these two schemes may be combined. For example, two failing MSs, assigned to the same rescue slot, may nevertheless be rescued simultaneously if the two MSs are assigned different rescue codes. Conversely, two failing MSs, assigned to the same rescue code, may nevertheless be rescued simultaneously if the two MSs are assigned to different rescue slots. It should be understood that various combinations of the features of code-based rescue and slot-based rescue, described above, fall within the scope of the present invention.

Although the simultaneous rescue procedure was described hereinabove using a CDMA cellular network as an example, the basic concepts of simultaneous rescue of connections in danger of being dropped are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a communications network for enabling communications with a plurality of mobile stations (MSs), a method for rescuing one or more MSs having potentially failing connections, comprising:

assigning a plurality of rescue codes to the plurality of MSs prior to encountering the potentially failing connections by initially assigning an equal distribution of the plurality of rescue codes to the plurality of MSs;

detecting the potentially failing connections;

each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail;

for each MS having a potentially failing connection, transmitting a rescue channel defined by the rescue code assigned to that MS;

at the network, searching for the rescue channel transmitted by each MS having a potentially failing connection; and for each rescue channel received by the network, continuing the connection with the MS that transmitted the rescue channel.

2. The method as recited in claim 1, further including:

each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

3. The method as recited in claim 1, further including:

determining the MS next most likely to fail by identifying the non-failing MS receiving weakest signals from the network.

4. The method as recited in claim 1, further including:

determining the MS next most likely to fail by identifying a non-failing MS having similar patterns of pilot energies as the MS detected as having a potentially failing connection.

5. The method as recited in claim 1, further including:

determining the MS next most likely to fail by identifying a non-failing MS located in the same area as the MS detected as having a potentially failing connection.

6. The method as recited in claim 1, further including:

determining the MS next most likely to fail by identifying a non-failing MS from which a predetermined number of bad frames have been received.

7. The method as recited in claim 1, further including:

determining the MS next most likely to fail by identifying a non-failing MS from which no proper acknowledgement was received after a predetermined number of retransmitted messages were sent by the network.

8. In a communications network for enabling communications with a plurality of mobile stations (MSs), a method for rescuing one or more MSs having potentially failing connections, comprising:

assigning a plurality of rescue slots to the plurality of MSs prior to encountering the potentially failing connections;

detecting the potentially failing connections;

for each MS having a potentially failing connection, transmitting a rescue channel during the rescue slot assigned to that MS;

at the network, searching for the rescue channel transmitted by each MS having a potentially failing connection; and for each rescue channel received by the network, continuing the connection with the MS that transmitted the rescue channel;

wherein a total number of available rescue slots is empirically selected to minimize both a time that the MS having a potentially failing connection must wait before rescue is initiated, and a likelihood that multiple MSs in need of rescue will be assigned to the same rescue slot; and wherein each rescue slot is less than a MS transmit duration during a rescue attempt, and an actual duration of each rescue slot is empirically selected in consideration of the total number of available rescue slots to minimize the chance of MS transmission overlap.

9. In a communications network for enabling communications with a plurality of mobile stations (MSs), a method for rescuing one or more MSs having potentially failing connections, comprising:

assigning a plurality of rescue codes to the plurality of MSs prior to encountering the potentially failing connections by initially assigning an equal distribution of the plurality of rescue codes to the plurality of MSs;

detecting the potentially failing connections;

each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail;

transmitting from the network a rescue channel for each MS having the potentially failing connection, each rescue channel defined by the rescue code assigned to each MS having the potentially failing connection;

at each MS having the potentially failing connection, searching for the rescue channel defined by the rescue code assigned to that MS; and continuing the connection when the rescue channel is discovered.

10. The method as recited in claim 9, further including:

each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

11. The method as recited in claim 9, further including:

determining the MS next most likely to fail by identifying the non-failing MS receiving weakest signals from the network.

12. The method as recited in claim 9, further including:

determining the MS next most likely to fail by identifying a non-failing MS having similar patterns of pilot energies as the MS detected as having a potentially failing connection.

13. The method as recited in claim 9, further including:
determining the MS next most likely to fail by identifying a non-failing MS located in the same area as the MS detected as having a potentially failing connection.

14. The method as recited in claim 9, further including:
determining the MS next most likely to fail by identifying a non-failing MS from which a predetermined number of bad frames have been received.

15. The method as recited in claim 9, further including:
determining the MS next most likely to fail by identifying a non-failing MS from which no proper acknowledgement was received after a predetermined number of retransmitted messages were sent by the network.

16. In a communications network for enabling communications with a plurality of mobile stations (MSs), a method for rescuing one or more MSs having potentially failing connections, comprising:
assigning a plurality of rescue slots to the plurality of MSs prior to encountering the potentially failing connections;
detecting the potentially failing connections;
for each MS having a potentially failing connection, transmitting a rescue channel assigned to the MS having the potentially failing connection from the network during the rescue slot assigned to that MS;
at each MS having the potentially failing connection, searching for the rescue channel assigned to that MS being transmitted by the network; and
continuing the connection when the rescue channel is discovered;
wherein a total number of available rescue slots is empirically selected to minimize both a time that the MS having a potentially failing connection must wait before rescue is initiated, and a likelihood that multiple MSs in need of rescue will be assigned to the same rescue slot; and
wherein each rescue slot is less than a network transmit duration during a rescue attempt, and an actual duration of each rescue slot is empirically selected in consideration of the total number of available rescue slots to minimize the chance of network transmission overlap.

17. In a communications network for enabling communications with a plurality of mobile stations (MSs), the plurality of MSs including two or more MSs having potentially failing connections and capable of transmitting a rescue channel, a method of operating the network to assist in rescuing one or more of the MSs having potentially failing connections, comprising:
assigning a plurality of rescue codes to the plurality of MSs prior to encountering the potentially failing connections by initially assigning an equal distribution of the plurality of rescue codes to the plurality of MSs;
detecting the potentially failing connections;
each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail;
searching for the rescue channel transmitted by each MS having a potentially failing connection, the rescue channel defined by the rescue code assigned to that MS; and
for each rescue channel received by the network, continuing the connection with the MS that transmitted the rescue channel.

18. The method as recited in claim 17, further including:
each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

19. In a communications network for enabling communications with a plurality of mobile stations (MSs), the plurality of MSs including two or more MSs having potentially failing connections, each MS having a potentially failing connection capable of transmitting a rescue channel during an assigned rescue slot, a method of operating the network to assist in rescuing one or more of the MSs having potentially failing connections, comprising:
assigning a plurality of rescue slots to the plurality of MSs prior to encountering the potentially failing connections;
detecting the potentially failing connections;
searching for the rescue channel transmitted by each MS having a potentially failing connection during the rescue slot assigned to that MS; and
for each rescue channel received by the network, continuing the connection with the MS that transmitted the rescue channel;
wherein each rescue slot is less than a MS transmit duration during a rescue attempt, and an actual duration of each rescue slot is empirically selected in consideration of the total number of available rescue slots to minimize the chance of MS transmission overlap.

20. In a communications network for enabling communications with a plurality of mobile stations (MSs), the plurality of MSs including two or more MSs having potentially failing connections, each MS having a potentially failing connection capable of receiving a rescue channel and rescuing the potentially failing connection, a method of operating the network to assist in rescuing one or more of the MSs having potentially failing connections, comprising:
assigning a plurality of rescue codes to the plurality of MSs prior to encountering the potentially failing connections by initially assigning an equal distribution of the plurality of rescue codes to the plurality of MSs;
detecting the potentially failing connections;
each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail; and
transmitting from the network a rescue channel for each MS having the potentially failing connection, each rescue channel defined by the rescue code assigned to each MS having the potentially failing connection.

21. The method as recited in claim 20, further including:
each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

22. In a communications network for enabling communications with a plurality of mobile stations (MSs), the plurality of MSs including two or more MSs having potentially failing connections, each MS having a potentially failing connection capable of receiving a rescue channel during an assigned rescue slot and rescuing the potentially failing connection, a method of operating the network to assist in rescuing one or more of the MSs having potentially failing connections, comprising:

assigning a plurality of rescue slots to the plurality of MSs prior to encountering the potentially failing connections;

detecting the potentially failing connections; and for each MS having a potentially failing connection, transmitting from the network a rescue channel assigned to the MS having the potentially failing connection during the rescue slot assigned to that MS;

wherein each rescue slot is less than a network transmit duration during a rescue attempt, and an actual duration of each rescue slot is empirically selected in consideration of the total number of available rescue slots to minimize the chance of network transmission overlap.

23. A communications system for enabling communications with a plurality of mobile stations (MSs) and rescuing one or more MSs having potentially failing connections, comprising:

a network having a network processor programmed for initially assigning an equal distribution of the plurality of rescue codes to the plurality of MSs prior to encountering the potentially failing connections and detecting the potentially failing connections and, each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail; and one or more MSs, each MS having a MS processor for detecting a potentially failing connection and transmitting a rescue channel defined by the rescue code assigned to that MS;

wherein the network processor is further programmed for searching for the rescue channel transmitted by each MS having a potentially failing connection, and for each rescue channel received by the network, continuing the connection with the MS that transmitted the rescue channel.

24. The system as recited in claim 23, the network processor further programmed for, each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

25. A communications system for enabling communications with a plurality of mobile stations (MSs) and rescuing one or more MSs having potentially failing connections, comprising:

a network having a network processor programmed for assigning a plurality of rescue codes to the plurality of MSs prior to encountering the potentially failing connections by initially assigning an equal distribution of the plurality of rescue codes to the plurality of MSs, and each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail, detecting the potentially failing connections, and each time a MS is detected as having a potentially failing connection, assigning to all remaining non-failing MSs an equal distribution of rescue codes not already assigned to the MSs detected as having a potentially failing connection, and transmitting from the network a rescue channel for each MS having a potentially failing connection, each rescue channel defined by the rescue code assigned to each MS having the potentially failing connection; and one or more MSs, each MS having a MS processor programmed for detecting a potentially failing connection, searching for the rescue channel defined by the rescue code assigned to that MS, and continuing the connection when the rescue channel is discovered.

26. The system as recited in claim 25, the network processor further programmed for, each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

27. A communications system for enabling communications with a plurality of mobile stations (MSs), the plurality of MSs including two or more MSs having potentially failing connections and capable of transmitting a rescue channel, and assisting in rescuing one or more of the MSs having potentially failing connections, comprising:

a network having a network processor programmed for assigning a plurality of rescue codes to the plurality of MSs prior to encountering the potentially failing connections by initially assigning an equal distribution of the plurality of rescue codes to the plurality of MSs, and each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail, detecting the potentially failing connections, searching for the rescue channel transmitted by each MS having a potentially failing connection, the rescue channel defined by the rescue code assigned to that MS, and for each rescue channel received by the network, continuing the connection with the MS that transmitted the rescue channel.

28. The system as recited in claim 27, the network processor further programmed for, each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

29. A communications system for enabling communications with a plurality of mobile stations (MSs), the plurality of MSs including two or more MSs having potentially failing connections and capable of receiving a rescue channel and rescuing the potentially failing connection, and assisting in rescuing one or more of the MSs having potentially failing connections, comprising:

a network having a network processor programmed for
the network processor further programmed for assigning a plurality of rescue codes to the plurality of MSs prior to encountering the potentially failing connections by initially assigning an equal distribution of the plurality of rescue codes to the plurality of MSs, and each time a MS is detected as having a potentially failing connection, assigning to a MS next most likely to fail a rescue code not already assigned to the MSs detected as having a potentially failing connection, and thereafter assigning to all remaining non-failing MSs an equal distribution of rescue codes not already assigned to the MSs detected as having a potentially failing connection and the MS next most likely to fail, detecting the potentially failing connections, and transmitting from the network a rescue channel for each MS having the potentially failing connection, each rescue channel defined by the rescue code assigned to each MS having the potentially failing connection.

30. The system as recited in claim 29, the network processor further programmed for, each time a MS is rescued by continuing the connection with that MS, re-assigning to all remaining non-failing MSs except the MS next most likely to fail an equal distribution of rescue codes not already assigned to the MSs detected as having a potentially failing connection and the MS next most likely to fail, the equal distribution including the rescue code assigned to the rescued MS.

\* \* \* \* \*